US007513830B2

(12) United States Patent
Hajder et al.

(10) Patent No.: US 7,513,830 B2
(45) Date of Patent: Apr. 7, 2009

(54) EXTENDABLE DISPLAY FOR A GAMING MACHINE

(75) Inventors: Peter Hajder, Lombard, IL (US); Jacob C. Greenberg, Elgin, IL (US); Gregory J. Tastad, Kenosha, WI (US); Wayne H. Rothschild, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 935 days.

(21) Appl. No.: 10/864,729

(22) Filed: Jun. 9, 2004

(65) Prior Publication Data

US 2005/0277477 A1 Dec. 15, 2005

(51) Int. Cl.
*A63F 9/24* (2006.01)
*A63F 13/00* (2006.01)

(52) U.S. Cl. ......................... 463/46; 361/681; 248/917; 248/918; 248/919; 248/920; 248/922; 248/923

(58) Field of Classification Search ................. 361/600, 361/681–683, 721–727; 248/917–923; 463/46
See application file for complete search history.

(56) References Cited

U.S. PATENT DOCUMENTS

| | | | | |
|---|---|---|---|---|
| 4,440,457 | A | 4/1984 | Fogelman et al. | 312/7.2 |
| 4,742,478 | A * | 5/1988 | Nigro et al. | 361/680 |
| 4,814,759 | A * | 3/1989 | Gombrich et al. | 345/60 |
| 5,229,920 | A * | 7/1993 | Spaniol et al. | 361/680 |
| 5,255,214 | A * | 10/1993 | Ma | 361/680 |
| 5,456,468 | A * | 10/1995 | Stringfellow et al. | 463/46 |
| 5,708,561 | A * | 1/1998 | Huilgol et al. | 361/681 |
| 5,813,914 | A | 9/1998 | McKay et al. | 463/46 |
| 6,016,171 | A * | 1/2000 | Tsao | 348/836 |
| 6,068,101 | A | 5/2000 | Dickenson et al. | 194/206 |
| 6,116,597 | A | 9/2000 | Rowe et al. | 273/143 R |
| 6,135,884 | A * | 10/2000 | Hedrick et al. | 463/20 |
| 6,164,645 | A | 12/2000 | Weiss | 273/138.2 |

(Continued)

FOREIGN PATENT DOCUMENTS

WO WO 02/078803 A1 10/2002

(Continued)

OTHER PUBLICATIONS

Bally Gaming Systems, "EVO Hybrid", www.ballygaming.com, (2000), 2 pages.

(Continued)

*Primary Examiner*—John M. Hotaling, II
*Assistant Examiner*—Steven J. Hylinski
(74) *Attorney, Agent, or Firm*—Nixon Peabody LLP

(57) ABSTRACT

The present invention relates to gaming machine cabinets and to the use of extendable displays to allow viewing and operation of the video display with the game machine cabinet door open. Many gaming machines, in particular those with flat-panel displays, have the flat-panel display mounted in the gaming cabinet door itself. When the door is opened, the display is no longer visible to technicians as they work on the interior components of the gaming machine. To solve this problem, the video display is pivotally mounted in the cabinet door to allow the video display to be released and rotated into a position viewable by the technician with the gaming cabinet door open.

14 Claims, 9 Drawing Sheets

U.S. PATENT DOCUMENTS

| | | | | |
|---|---|---|---|---|
| 6,201,532 | B1 * | 3/2001 | Tode et al. | 345/156 |
| 6,233,138 | B1 * | 5/2001 | Osgood | 361/681 |
| 6,254,481 | B1 | 7/2001 | Jaffe | 463/20 |
| 6,262,885 | B1 * | 7/2001 | Emma et al. | 361/683 |
| 6,275,376 | B1 * | 8/2001 | Moon | 361/683 |
| 6,302,612 | B1 * | 10/2001 | Fowler et al. | 403/76 |
| D454,122 | S * | 3/2002 | Hori et al. | D14/132 |
| 6,392,877 | B1 * | 5/2002 | Iredale | 361/683 |
| 6,464,195 | B1 * | 10/2002 | Hildebrandt | 248/460 |
| 6,475,087 | B1 | 11/2002 | Cole | 463/20 |
| 6,504,707 | B2 * | 1/2003 | Agata et al. | 361/681 |
| 6,522,529 | B1 * | 2/2003 | Huilgol et al. | 361/681 |
| 6,572,204 | B1 | 6/2003 | Hedrick et al. | 312/223.1 |
| D477,850 | S * | 7/2003 | Hussaini et al. | D21/333 |
| 6,638,166 | B2 | 10/2003 | Hedrick et al. | 463/20 |
| D482,669 | S * | 11/2003 | Hori et al. | D14/132 |
| 6,646,695 | B1 | 11/2003 | Gausselmann | 349/58 |
| 6,663,155 | B1 * | 12/2003 | Malone et al. | 296/37.8 |
| 6,665,175 | B1 * | 12/2003 | deBoer et al. | 361/681 |
| 6,688,984 | B2 * | 2/2004 | Cole | 463/46 |
| 6,711,004 | B2 * | 3/2004 | Yen et al. | 361/681 |
| 6,724,317 | B1 * | 4/2004 | Kitano et al. | 340/691.1 |
| D493,154 | S * | 7/2004 | Hussaini et al. | D14/132 |
| D497,886 | S * | 11/2004 | Hussaini et al. | D14/126 |
| 6,827,409 | B2 * | 12/2004 | Michael | 312/223.3 |
| 6,842,338 | B2 * | 1/2005 | Iredale | 361/683 |
| 6,962,528 | B2 * | 11/2005 | Yokota | 463/25 |
| 6,976,919 | B2 * | 12/2005 | Cole | 463/46 |
| 7,055,790 | B2 * | 6/2006 | Schroeter | 248/323 |
| 7,082,028 | B2 * | 7/2006 | Huilgol et al. | 361/681 |
| 7,267,613 | B2 * | 9/2007 | Cole | 463/20 |
| 2002/0041133 | A1 | 4/2002 | Hedrick et al. | 312/223.1 |
| 2002/0060124 | A1 | 5/2002 | Thompson | 194/350 |
| 2004/0018870 | A1 * | 1/2004 | Cole | 463/20 |
| 2004/0018877 | A1 | 1/2004 | Tastad et al. | 463/46 |
| 2004/0053699 | A1 | 3/2004 | Rasmussen et al. | 463/46 |
| 2004/0061284 | A1 | 4/2004 | Satoh | 273/138.1 |
| 2004/0125549 | A1 * | 7/2004 | Iredale | 361/681 |
| 2004/0141095 | A1 * | 7/2004 | Quinno et al. | 348/837 |
| 2005/0059496 | A1 * | 3/2005 | Hanchar | 463/46 |
| 2005/0168499 | A1 * | 8/2005 | Williams et al. | 345/905 |
| 2005/0168926 | A1 * | 8/2005 | Lee et al. | 361/683 |

FOREIGN PATENT DOCUMENTS

WO WO-03/028829 A1 4/2003

OTHER PUBLICATIONS

WMS Gaming Inc., "3RV™", *Product Sheet*, (2002 or earlier), 1 page.

U.S. Appl. No. 10/660,271, filed Sep. 11, 2003, Hanchar.

* cited by examiner

EXTENDABLE DISPLAY FOR A GAMING MACHINE

FIELD OF THE INVENTION

The present invention relates generally to gaming machines and, more particularly, to an extendable display for a gaming machine to facilitate maintenance related activities.

BACKGROUND OF THE INVENTION

Electromechanical and electronic video gaming machines have long been cornerstones of the gaming industry. Because gaming machines are an important source of income for the gaming industry, casinos continually search for new ways to improve gaming machine capabilities, efficiency, and reliability.

There are three main types of gaming machines: mechanical, electromechanical, or electronic. The original slot-type gaming machines were entirely mechanical. Electromechanical gaming machines replaced all-mechanical gaming machines. Electromechanical gaming machines use a microprocessor to determine a random outcome and electric motors to spin and stop the mechanical reels. The electronic video gaming machine largely supplanted the mechanical reels of the electromechanical gaming machine with a video monitor to simulate mechanical reels. Video monitor displays typically include cathode ray tubes and flat panel type displays including LED displays, plasma displays, etc.

The gaming industry predominantly uses one of two different types of gaming cabinets to house the electrical, electronic, and mechanical components that comprise these various types of gaming machines. A slant top type gaming cabinet can be characterized by a video display screen that rests at approximately 30 degrees to the horizontal. This slant top type gaming cabinet allows the player to position their legs partially under the cabinet.

The other type of gaming cabinet is known as an "upright" cabinet. The upright cabinet has a video display screen that is approximately perpendicular to the floor. This type of gaming machine does not allow the player to position their legs under the gaming cabinet. The upright cabinet is less comfortable for a player to operate as the player has a larger standoff position from the cabinet. This prevents the player from comfortably placing their arms on the gaming cabinet. The chief advantage of the upright cabinet is that it takes up less floor space than the slant top. The upright cabinets allow the game establishment to operate more gaming machines per square foot—a significant economic advantage.

The use of microprocessors (also known as central processing units or CPU's) significantly advanced the state of the art of gaming machines. Microprocessor power allows gaming machines much greater latitude in determining random game outcomes. A random number generator driven by the CPU determines random game outcomes. A probability table contains all possible game outcomes with each game outcome linked to a number. The random number generated is used to look up the corresponding game outcome in the probability table. The CPU signals the stepper motors of the electromechanical gaming machine to drive and position the reels based on the randomly determined game outcome.

Microprocessor driven gaming machines allow gaming manufacturers to design slot games with more flexible pay tables. With a properly constructed pay table, microprocessor driven gaming machines can offer high value but low probability awards while still offering low value but high probability awards—offering a range of awards that would not otherwise be available.

The power of the microprocessor has also allowed the introduction of new gaming machine features and functions. For example, the microprocessor has allowed the introduction of player tracking cards, cashless gaming, touch screen input devices, biometric security devices, enhanced sound and video processing, and many other similar types of features that require the computing power of a sophisticated microprocessor. These features and functions can be enabled in a variety of combinations and operate on a variety of gaming platforms. The problem introduced by the variety of features and functions that can be offered is that gaming machines become increasingly more complex, are prone to more frequent failures, and more difficult to troubleshoot and repair. To assist technicians with these repairs, diagnostic programs are available through the gaming machine's CPU. These diagnostic programs are available to the technician through the video display. The results of maintenance diagnostic programs used to troubleshoot a gaming machine may be viewed on the video display screen.

The electronic video gaming machine's touch screen can be used as an input device to operate maintenance diagnostic programs. The technician is stepped through the diagnostic process with instructions and options displayed on the video display. The technician may make appropriate selections using the touch screen panel.

Assembly-line workers also use the video display to assist in the assembly of gaming machines to ensure that all of the hardware components have been assembled correctly and are functioning properly. In much the same manner as maintenance technicians, the assembly-line worker may use the video display to run diagnostic programs at the end of the manufacturing line as a quality control measure. Any problems identified with the gaming machine can then be corrected.

Maintenance activities often require the opening of the cabinet door to allow technicians to reach internal components. With the cabinet door open, however, the technician is unable to view the video display in the prior art gaming machines. This cabinet configuration hinders the efficient resolution of maintenance problems. The technician must constantly shift the cabinet door from the closed to the open position to alternately view the video display and then to perform maintenance activities inside the gaming cabinet.

The constant maneuvering of the cabinet door from the open to the closed position not only hinders efficiency and productivity, but also presents a potential work hazard—heads have been hit and limbs pinched from the constant maneuvering of the cabinet door. What is needed is a way to allow technicians to perform maintenance and testing activities with the cabinet door fully open and the video display always visible and available to technicians.

SUMMARY OF THE INVENTION

To service electronic video gaming machines, the cabinet door of the gaming cabinet must be open to give technicians access to the interior of the gaming machine to make repairs and perform diagnostic tests. In addition to accessing the interior of the gaming cabinet, the technician must be able to read the video display to access maintenance diagnostic programs, to obtain diagnostic information, and to make diagnostic selections that affect the functionality of the gaming machine. Because the video display of both upright and slant top cabinets are not visible to technicians from the interior side of the cabinet door when the cabinet door is opened, it is difficult for technicians to perform maintenance and repair tasks. To improve the maintenance process and overall gaming machine maintainability, an improved video gaming cabinet has been developed to allow a maintenance technician to view the video display with the cabinet door open while performing maintenance activities inside the gaming cabinet.

This improved gaming cabinet uses a video display that can be rotationally translated from its normally flush position in the cabinet door. When the gaming cabinet door is opened, the video display may be rotationally translated and extended away from the cabinet door to place the video display in a comfortable viewing position for the technician from the interior side of the open cabinet door.

Additional aspects of the invention will be apparent to those of ordinary skill in the art in view of the detailed description of various embodiments that is made with reference to the drawings, a brief description of which is provided below.

BRIEF DESCRIPTION OF THE DRAWINGS

The foregoing and other advantages of the invention will become apparent upon reading the following detailed description and upon reference to the drawings in which.

Figure 1:
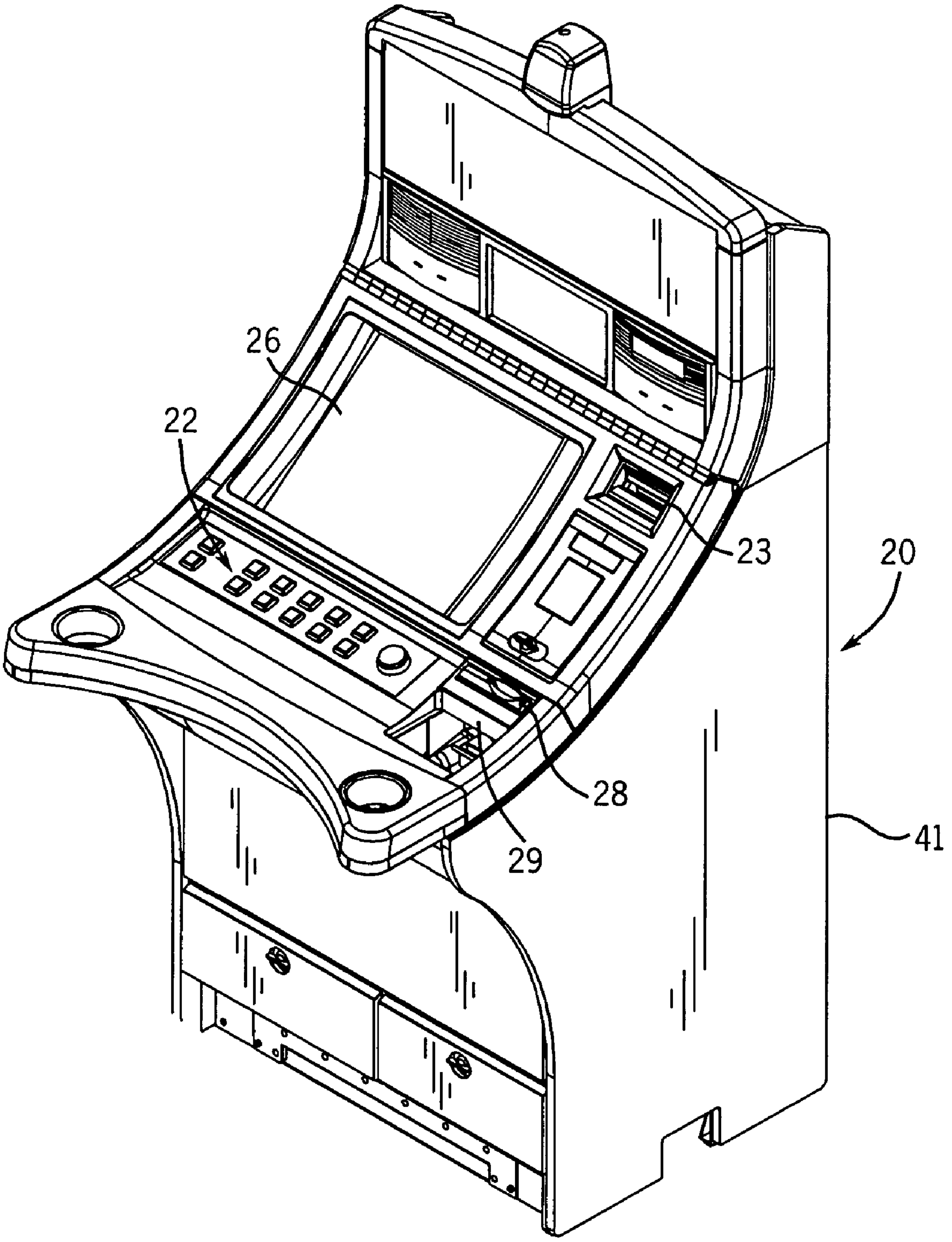
FIG. 1 is a perspective view of a slant top gaming machine.

While the invention is susceptible to various modifications and alternative forms, specific embodiments have been shown by way of example in the drawings and will be described in detail herein. It should be understood that the invention is not intended to be limited to the particular forms shown. The invention is to cover all modifications, equivalents, and alternatives falling within the spirit and scope of the invention as defined by the appended claims.

DETAILED DESCRIPTION

The description of the embodiments is to be construed as exemplary only and does not describe every possible embodiment of the invention. Many alternative embodiments could be implemented, using either current technology or technology developed after the filing date of this patent, which would still fall within the scope of the claims defining the invention.

Figure 2:
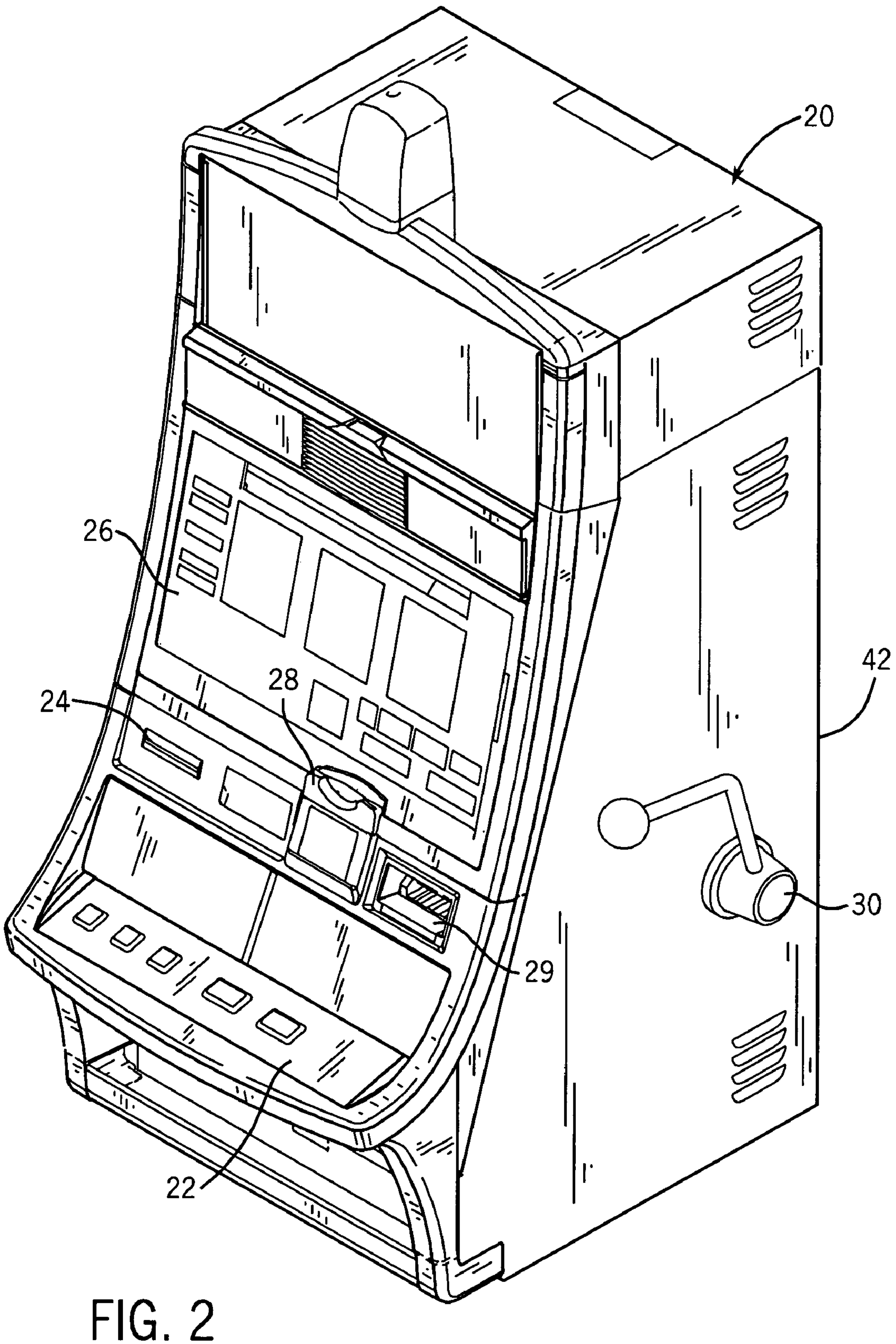
FIG. 2 is a perspective view of an upright gaming machine.

FIG. 1 and FIG. 2 are perspective views of exemplary gaming machines 20 to which embodiments of the present invention can be applied. The gaming machine 20 of FIG. 1 has a slant top gaming cabinet 41. The gaming machine 20 of FIG. 2 has an upright gaming cabinet 42. The video games presented on these gaming machines 20 may include such games as blackjack, slots, keno, bingo, poker, etc.

Both slant top and upright gaming machine 20 use similar or identical components. Gaming machines 20 may have varying structures, components, and methods of operation Typical components found in these gaming machines 20 are described below. It should be understood that many other components exist and may be used in any number of combinations to create a variety of gaming machines.

Turning to FIG. 1 and 2, the game is displayed to the player on a video display 26 such as a CRT or a flat-panel display such as a LCD display, a plasma display, LED display, or any other type of video display suitable for use in a gaming machine 20. The gaming machine 20 typically includes a touch screen 21 over the video display 26 that allows players to make game selections through the touch screen 21. The player may also make game selections using a push button panel 22.

Many gaming machines 20 are also equipped with a player tracking card reader 24. A player may be enrolled in the gaming establishment's player club, which may award certain complimentary services/offers commensurate with the points collected by the player. The player's card is inserted into the player tracking card reader 24, which allows the casino's computers to register that player's wagering activity at that gaming machine 20.

A wager acceptor, such as a coin slot acceptor 28 or bill validator 29, may be used to place a wager on the gaming machine 20. The bill validator 29 can accept either paper currency or ticket vouchers. The bill validator 29 reads the currency or the ticket voucher and applies the value read as credits playable on the gaming machine.

Gaming machines 20 also generally have a ticket printer 23 used to print or otherwise encode ticket vouchers with a monetary value. The ticket printer is used in cashless gaming systems and allows a player to receive a ticket voucher instead of currency when a player cashes out of the gaming machine 20. The ticket voucher contains not only the monetary value of the ticket, but also typically the casino name, validation number, bar code with control and/or security data, date and time of issuance of the ticket voucher, redemption instructions and restrictions, etc. The ticket voucher may be redeemed at a cashier.

Figure 3:
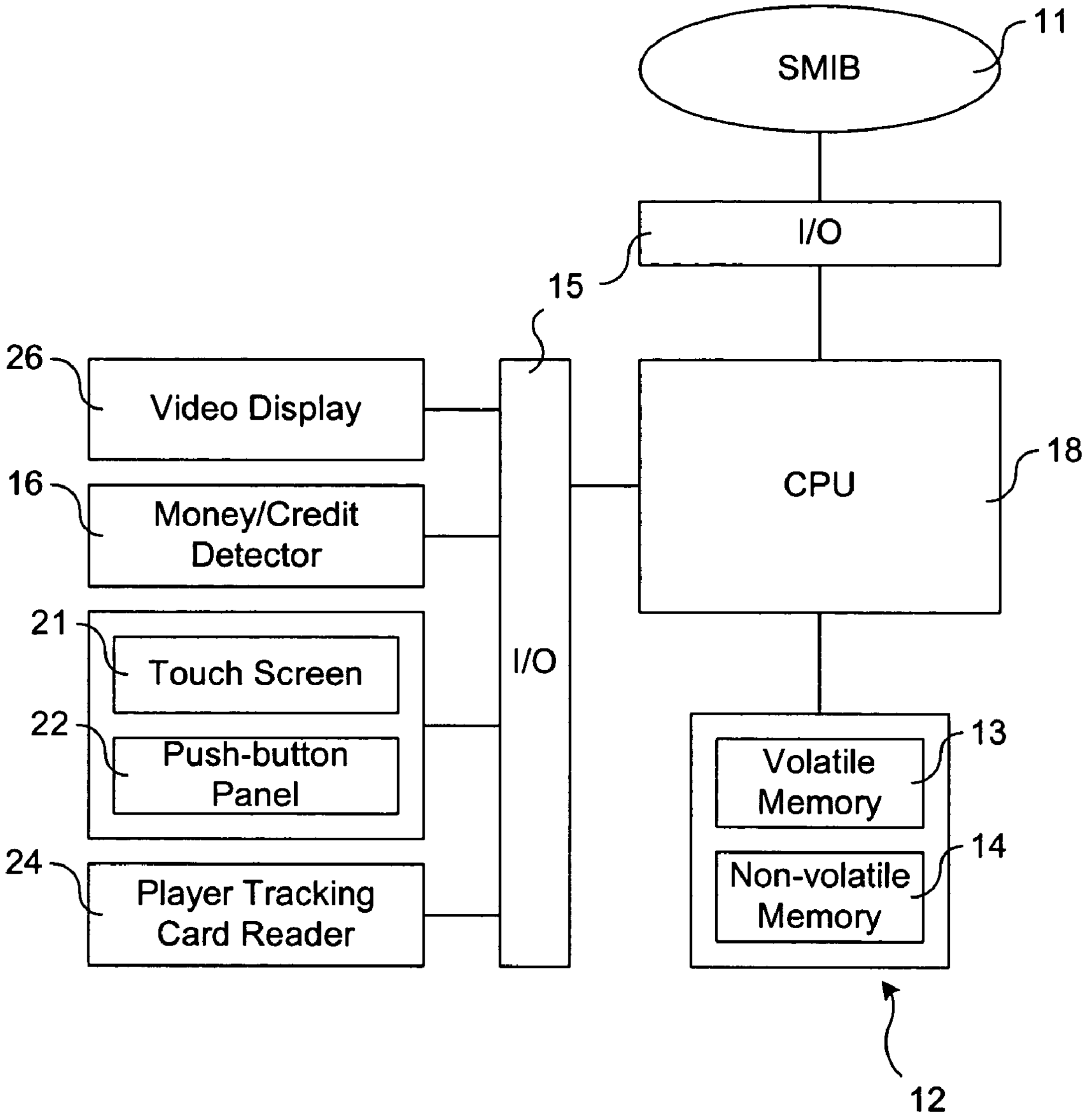
FIG. 3 is a block diagram of the electronic components typically used in the gaming machine of FIG. 1 and FIG. 2.

The push button panel 22, a player tracking card reader 24, stepper motors, bill validator 29, ticket printer 23, coin acceptor 28, and various other components of a gaming machine 20 are controlled by a central processing unit (CPU) 18 (such as a microprocessor or microcontroller) as shown in FIG. 3. In addition to controlling peripheral devices, the central processing unit 18 operates to execute a game program.

The game program is stored in the system memory 12 of the CPU 18. The CPU 18 may comprise a volatile memory 13 (e.g., a random-access memory (RAM)), a non-volatile memory 14 (such as an EEPROM), and an input/output (I/O) circuit 15. The CPU 18 may also be in communication with a host server typically located inside the gaming establishment. The host server typically receives and records financial transactions that are occurring at each gaming machine 20 to maintain each individual player's account and maintain security over the entire network of gaming machines. In addition, a host server is often used with a player-tracking card and the player tracking card reader 24 at each of the gaming terminals 20 to record a player's wagering activities.

As can be seen by the number and complexity of gaming machine functions, considerable maintenance is required to maintain gaming machine functionality. This maintenance may include both predictive, preventive, and corrective maintenance activities. To assist with these maintenance activities, the CPU 18 may also include a maintenance diagnostic program that can be used with the video display 26 and touch screen 21 to facilitate maintenance tasks.

Besides maintenance activities, gaming machines 20 must also be accessed to configure the gaming machine to casino specifications. This configuration process typically includes using the touch screen to make selections that allow the gaming machine 20 to be customized to function within a particular gaming establishments specification. The selections include software selections, peripheral selections, wagering options, sound volume, etc. All of these activities generally require access to the gaming machine 20 and often require, or are assisted by, reference to the gaming machine's video display 26.

Consequently, technicians use the video display 26 to troubleshoot and configure gaming machines 20. The video display not only provides information to the technician but also allows the technician to input data and select options through the touch screen 21. Through the interaction of the technician with the video display 26 and the various peripheral components, the equipment can be quickly analyzed and repaired.

Figure 4:
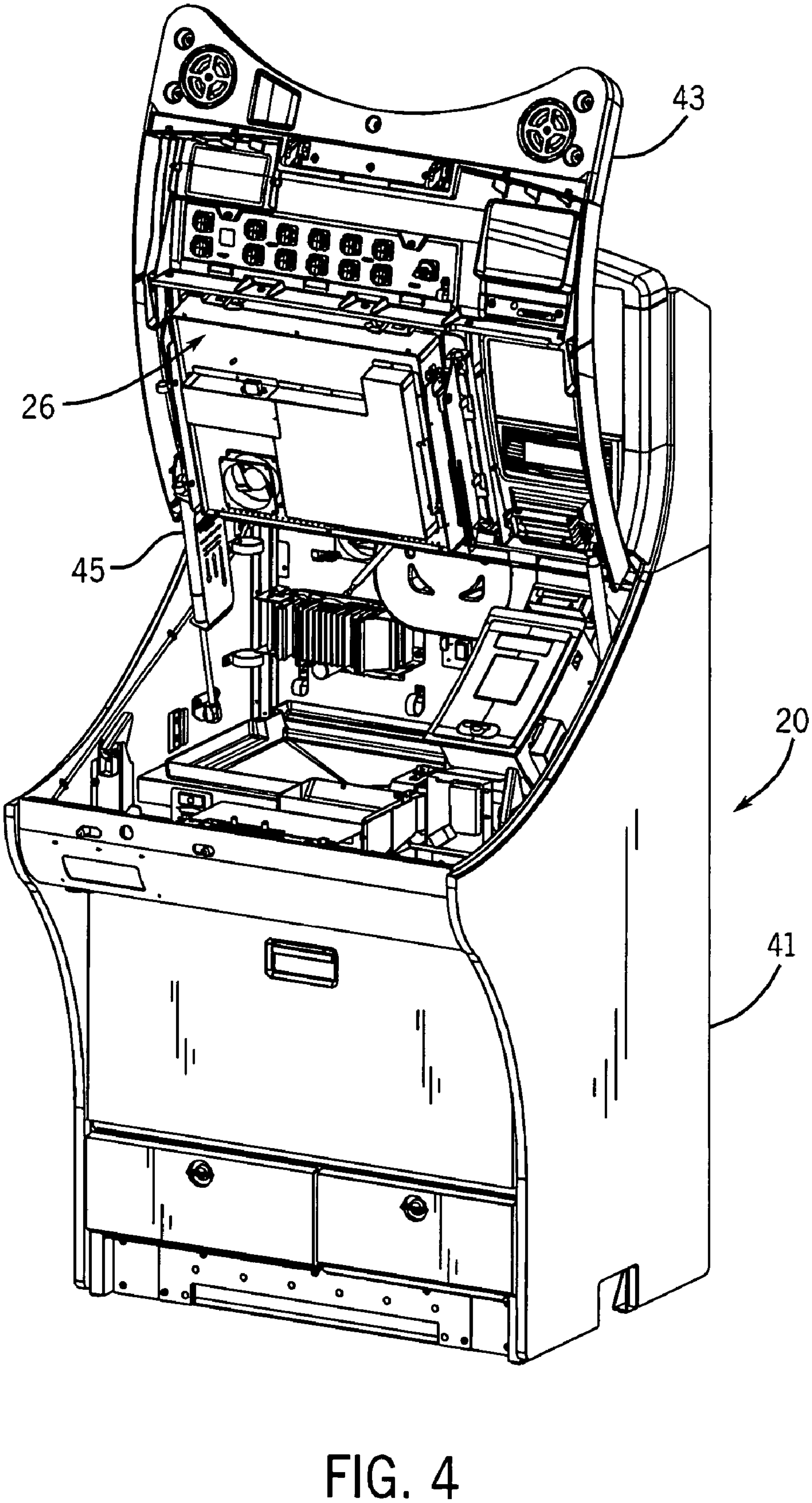
FIG. 4 is a perspective view of the slant top gaming machine of FIG. 1 with the cabinet door in the open position.
Figure 5:
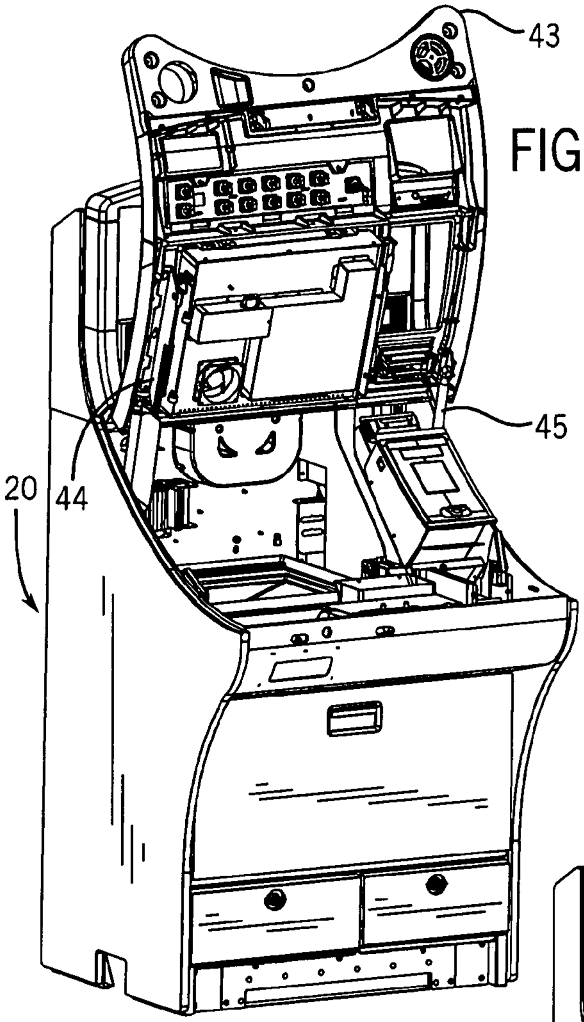
FIG. 5 is FIG. 4 from a different perspective.

In the slant top cabinet 41, the cabinet door 43 pivots open in the vertical direction as shown in FIG. 4. In the upright cabinet 42, the cabinet door swings open in the horizontal plane. The cabinet door 43 for either the slant top or the upright cabinet may be supported by at least one shock absorber, such as a pneumatic or hydraulic type shock absorber 45 that keeps the cabinet door 43 propped in the open position.

A variety of shocks 45 may be used to keep the cabinet door 43 open. Certain select types of shocks 45 have a bounce activated release mechanism. These types of shocks 45 have an internal locking mechanism, in addition to internal pressurization, to keep the cabinet door in the open position. Imposing a slight compressive force to slightly depress and then releasing the force on the shocks while in the open and locked position unlocks the shocks, allowing them to compress and return the door to the closed position. This allows the cabinet door 43 to be closed without reaching inside the cabinet to mechanically release the prior art locking mechanisms. If desired the inside cabinet locking mechanisms may be retained to provide a backup safety feature that can be used to ensure that the pneumatic struts do not collapse.

The cabinet door 43 has an exterior side, normally visible to a player, and an interior side that can only be seen with the cabinet door open. Access to the interior of a gaming machine 20, whether it is a slant top cabinet 41 or an upright cabinet 42, places the video display 26 out of sight of the technician in the prior art game cabinet designs. The video display 26 is mounted to the cabinet door 43 in the prior art designs, but the display cannot be reached or viewed by the technician.

This impedes the technician's ability to perform maintenance on the gaming machine 20. During the repair, that technician must alternate between the open and closed positions of the cabinet door 43 to view and select various options displayed on the video display 26. Not only is the constant positional movement of the cabinet door 43 an impediment to efficient troubleshooting, it also presents a safety hazard to the technicians that are working on the equipment.

Figure 6:
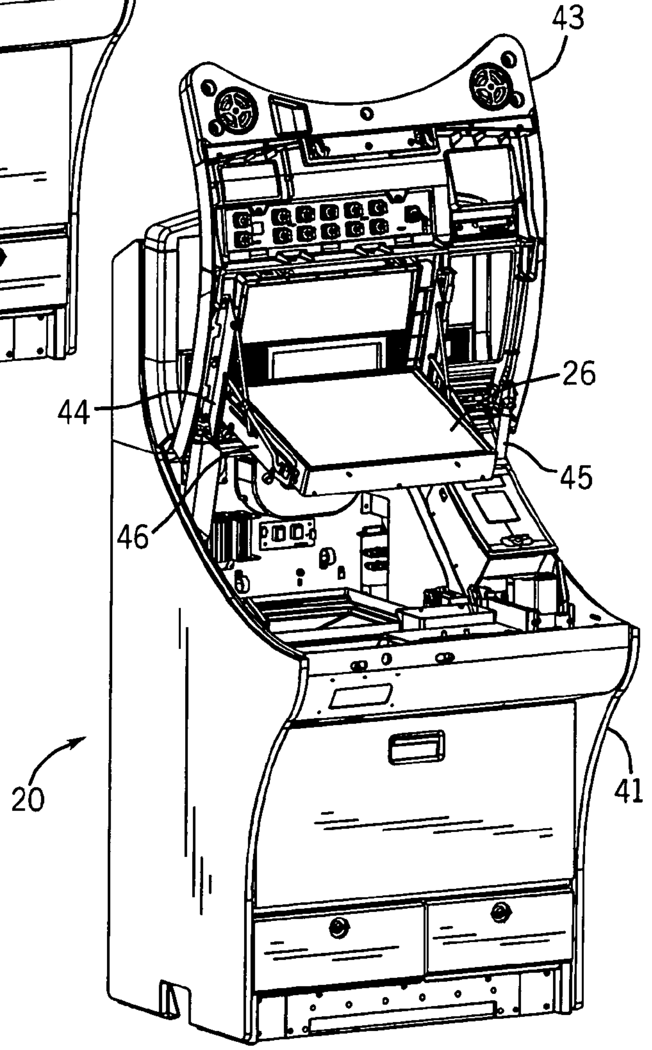
FIG. 6 is a perspective of the slant top gaming machine of FIG. 5 with the video display in its extended position.

To eliminate the need to alternately move the cabinet door 43 from the open to the closed position, the video display 26 has been configured in accordance with the present invention to be movable from its normal mounted position in the cabinet door to a position that can be viewed and reached by technicians with the cabinet door in the open position. Any pivot mechanism 44 or its equivalent may be used that allows the rotational displacement of the video display 26 away from the open cabinet door 43 as shown in FIG. 6. Further, if wanted, the video display 26 may be placed closer to the technician with an extension mechanism 46. Extension mechanisms 46 include interlocking sliding rails or scissors linkages.

For example, as shown in FIG. 4, the video display 26 may be pivotally mounted to the cabinet door 43. The cabinet door 43 opens in the same way as with prior art gaming machines 20. The video display 26, however, instead of being rigidly affixed to the cabinet door 43 out of sight and out of reach of the technician, can be rotationally translated away from its flush mounted position. If necessary or desired, a locking mechanism 45 can also be incorporated into the design to allow the video display 26 to be locked into its flush mounted position once the cabinet door 43 is in the closed position. The locking mechanism 45 may be a simple latch or any other type of locking device.

The rotational translation of the video display 26 can be accomplished with any number of pivot mechanisms 44. These pivot mechanisms 44 include hinges (such as a piano hinge) or a pair of trunnions. For example, a slant top cabinet 41 as shown in FIG. 4 has a video display 26 that is pivotally mounted on one edge and locked in place with a locking mechanism 45. The locking mechanism 45 can be released to allow the video display 26 to pivot downward into the technicians view with the cabinet door 43 open.

In addition, an extension mechanism 46 may be attached between the video display 26 and the pivot mechanism 44 to allow the video display 26 to not only rotationally translate, but also to linearly translate away from the cabinet door 43 to place the video display 26 in even closer proximity to the technician. The extension mechanism 46 may include, for example, a scissor extension mechanism or interlocking sliding rails.

Figure 7:
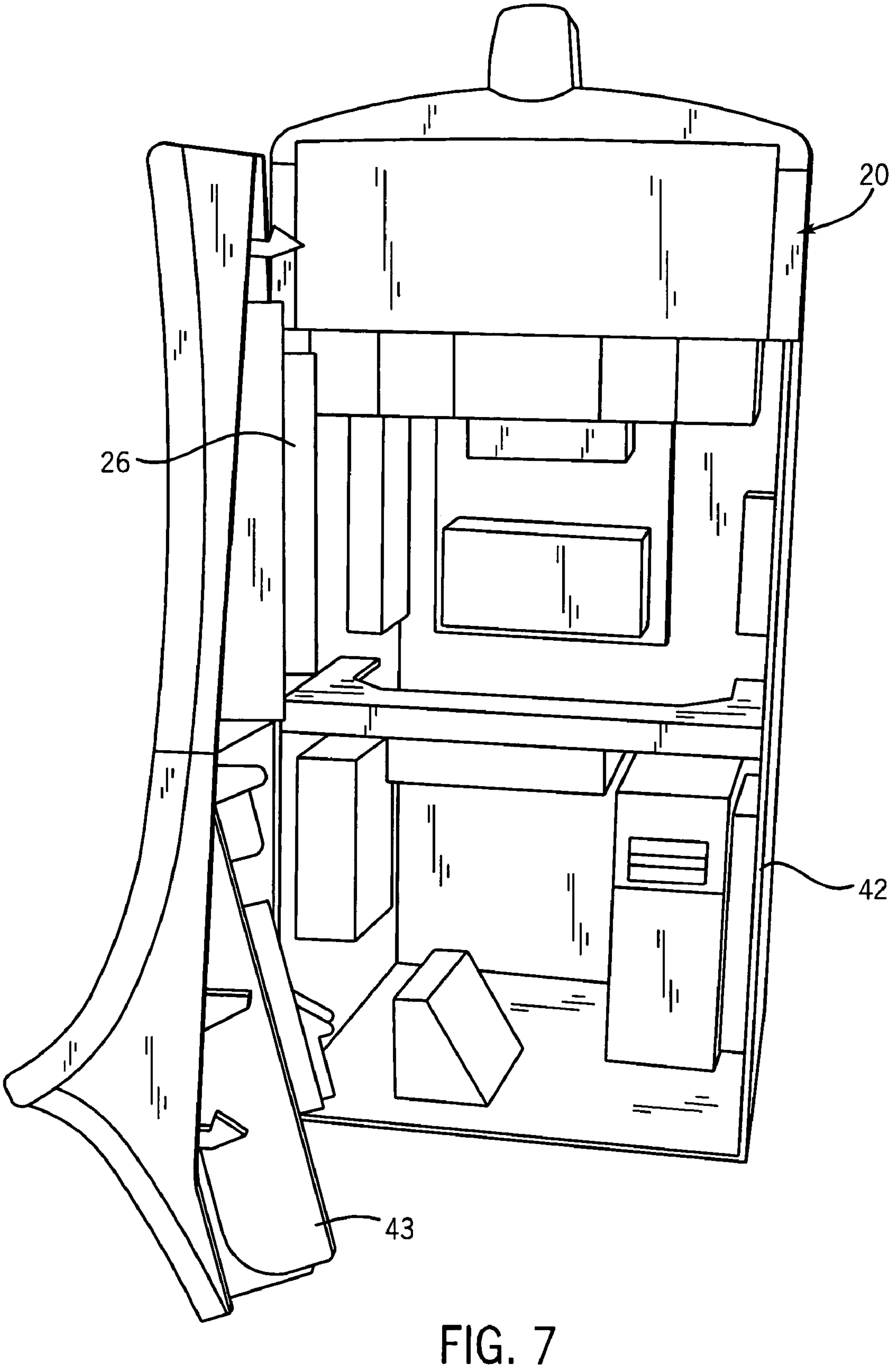
FIG. 7 is a perspective view of an upright gaming machine of FIG. 2 with the cabinet door open.
Figure 8:
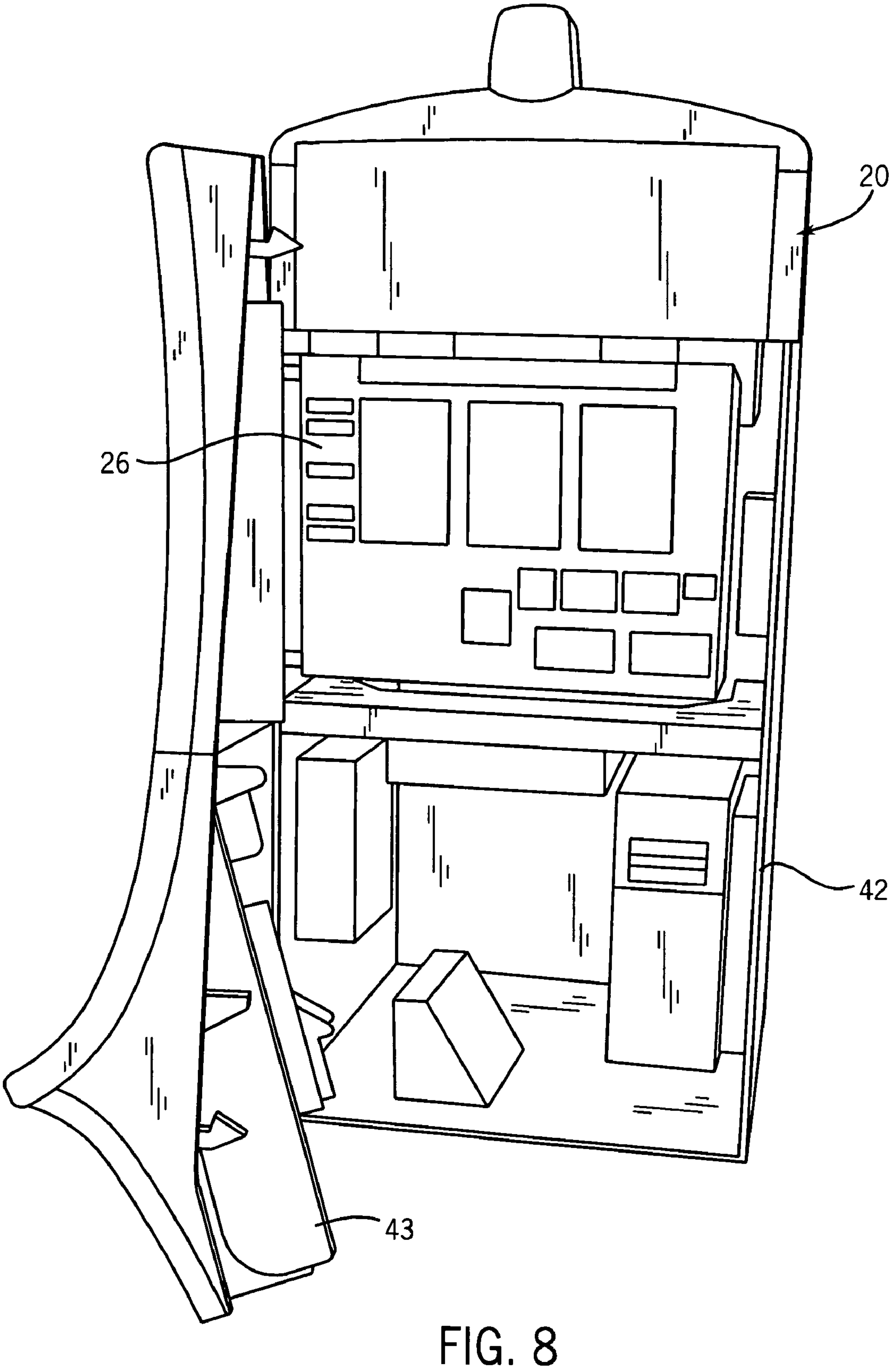
FIG. 8 is a perspective view of the upright gaming machine of FIG. 7 with the video display in its extended position.

Although the previous examples use a slant top cabinet 41, the present invention can also be used with upright cabinets 42. Turning to FIG. 7, the upright cabinets 42 have cabinet doors 43 that open around a vertical axis, rather than the horizontal axis as in the slant top cabinets 41. The video display 26 of the upright cabinet 42 rotationally may rotate away from the cabinet door 43 around a substantially vertical axis as shown in FIG. 8. It is possible for the video display 26 to rotate in other directions and still the viewable by the technician. Similar to the slant top cabinet 41, the video display 26 may also use an extension mechanism to place the video display 26 in closer proximity to the technician.

Slot machine pull arm

In prior gaming machines 20, the pull arm extends directly from the gaming machine as shown in FIG. 2. Inside the gaming machine 20 are pull arm components that make the pull arm operable. Although the pull arm 30 merely activates the gaming machine 20, to give players the realism of a mechanical slot-type machine, the pull arm is designed to provide tactile feedback to the player. This tactile feedback is provided principally by a return spring 32. The mechanical assembly required to provide this tactical feedback must be sufficiently robust to realistically simulate a mechanical slot type gaming machine. With the advent of new ergonometric cabinets, the size of the pull arm assembly has become a design problem, and can no longer be easily fitted within the gaming machine. As a result, the pull arm assembly 36 now presents a number of potential spatial conflicts with other components within the gaming machine 20.

Figure 9:
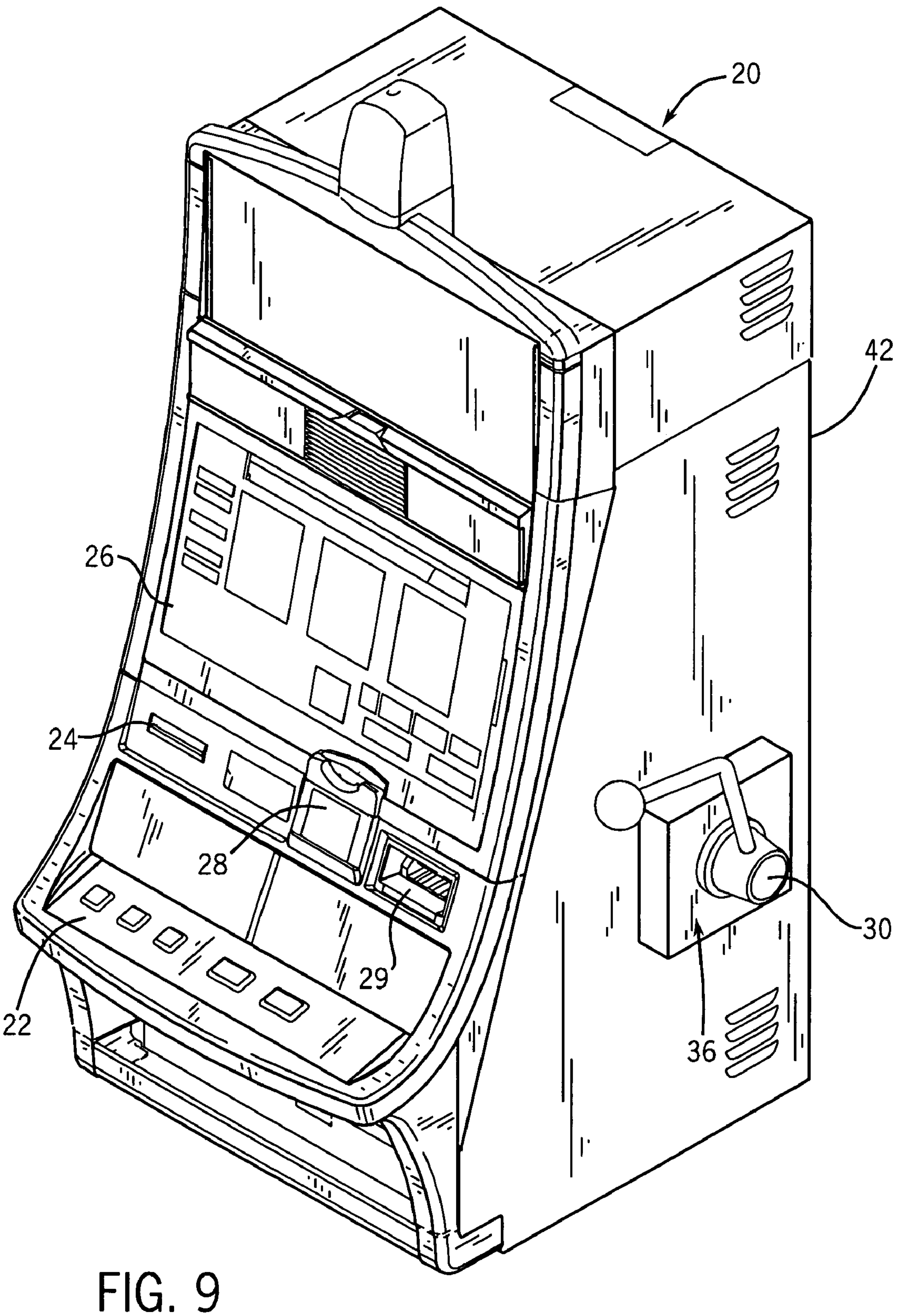
FIG. 9 is a perspective view of an upright gaming machine with the pull arm mechanism in an exterior housing.
Figure 10:
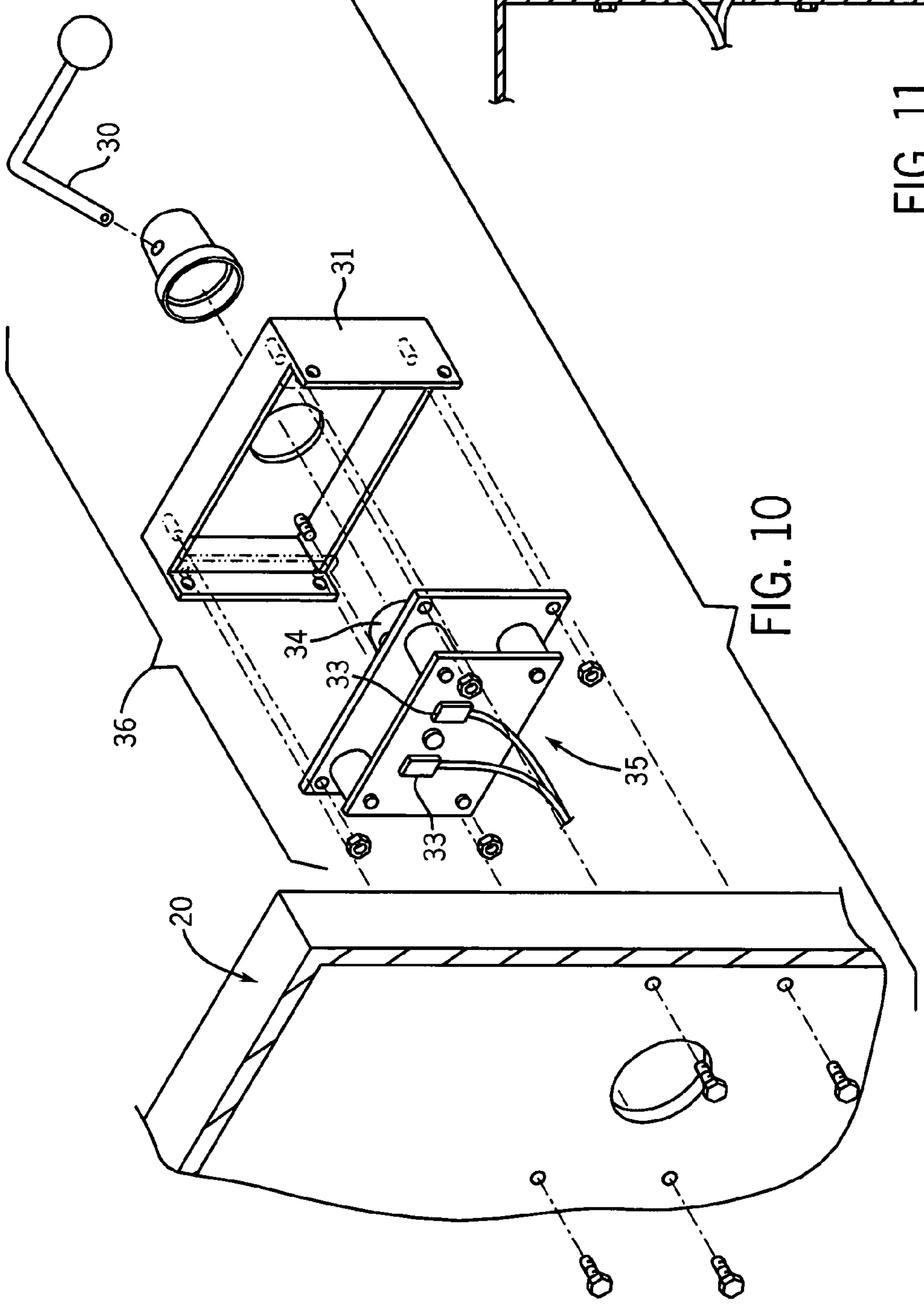
FIG. 10 is an exploded view of the pull arm assembly.
Figure 11:
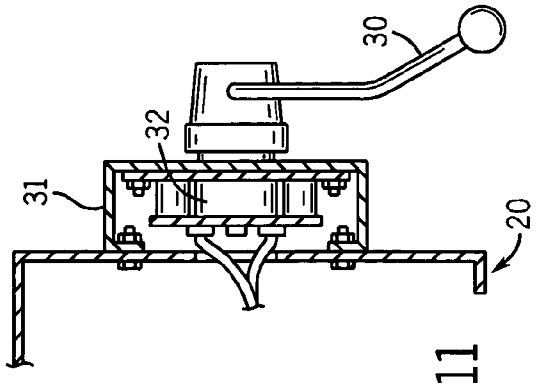
FIG. 11 is a cross-sectional view of the pull arm assembly.

To avoid these spatial conflicts, the pull arm assembly 36 has been redesigned to be fitted on the outside of the gaming machine within its own pull arm housing 31 as shown in FIG. 9 and FIG. 10. The pull arm housing 31 shown in FIG. 10 and FIG. 11 contains the solenoid 34, and microswitches 33, and the return spring 32 that accepts the pull arm 30. The pull arm 30, once actuated, has a cam mechanism that catches the return spring 32 and activates one of two microswitches 33. The microswitch 33 causes the gaming machine 20 to activate and produce a game outcome. The solenoid locking mechanism 34, however, prevents movement of the pull arm 30 until a wager has been placed in the gaming machine 20. Once the pull arm 30 is released, the pull arm is automatically retracted back into its original position with the return spring (i.e., torsional spring) 32. Placing the pull arm assembly 36 outside the cabinet frees up substantial space within the cabinet for other peripheral components.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming machine, comprising:

a cabinet;

a cabinet door mounted to the cabinet, the cabinet door having a closed position and an open position, the cabinet door having an exterior side and an interior side; and a video display mounted to the cabinet door, the video display having a first position substantially flush with the cabinet door to allow unobstructed viewing of the video display from the exterior side of the cabinet door with the cabinet door in the closed position, a second position substantially flush with the cabinet door with an obstructed view of the video display from the interior side of the cabinet door with the cabinet door in the open position, and a third position to allow unobstructed viewing of the video display from the interior side of the cabinet door with the cabinet door in the open position.

2. The gaming machine of claim 1, wherein the video display is further operable from the third position to be rotationally translated away from the cabinet door in the open position.

3. The gaming machine of claim 2, wherein the video display is attached to the cabinet door with a pivot mechanism to allow rotational translation of the video display from the second position to the third position.

4. The gaming machine of claim 1, further comprising a retainer to selectively affix the video display in the first position.

5. The gaming machine of claim 3, further including an extension mechanism mounted between the pivot mechanism and the video display to allow the video display to be linearly translated away from the cabinet door.

6. The game machine of claim 1, wherein the video display is selected from the group of a flat-panel display, a LED display, and a LCD display.

7. The gaming machine of claim 1, wherein the gaming cabinet is a slant-type gaming machine.

8. The gaming machine of claim 1, further including a touch screen in operable association with the video display.

9. A method of performing maintenance on a gaming machine, comprising:

opening a cabinet door of the gaming machine, the cabinet door having an open and a closed position, the cabinet door further having an exterior and an interior side, the cabinet door having a pivotally mounted video display, the video display substantially flush with the cabinet door to enable the video display to have an unobstructed view from the exterior side of the cabinet door in the closed position and an obstructed view from the interior side of the cabinet door in the open position; and rotating the video display away from the cabinet door in the open position to allow the video display to have an unobstructed view from the interior side of the cabinet door.

10. The method of claim 9, further including linearly translating the video display away from the cabinet door.

11. The method of claim 9, further including:

affixing selectively the video display to the cabinet door; and releasing the video display prior to rotating the video display.

12. The gaming machine of claim 1, further comprising a shock, the shock connecting the cabinet door to the cabinet, the shock having an internal locking mechanism for holding the cabinet door in the open position, the locking mechanism selectively engageable when the shock is extended from the closed position to the open position.

13. The gaming machine of claim 12, wherein the shock further includes a release mechanism, the release mechanism for disengaging the locking mechanism when the cabinet door is depressed and released.

14. The gaming machine of claim 1, further comprising:

a pull arm housing attached to the exterior of the cabinet, the pull arm housing containing the pull arm assembly; and a pull arm rotateably connected to the pull arm assembly for activating the gaming machine, the pull arm assembly for converting the rotational displacement of the pull arm to an electrical signal to activate the gaming machine.

* * * * *